United States Patent Office 3,507,843
Patented Apr. 21, 1970

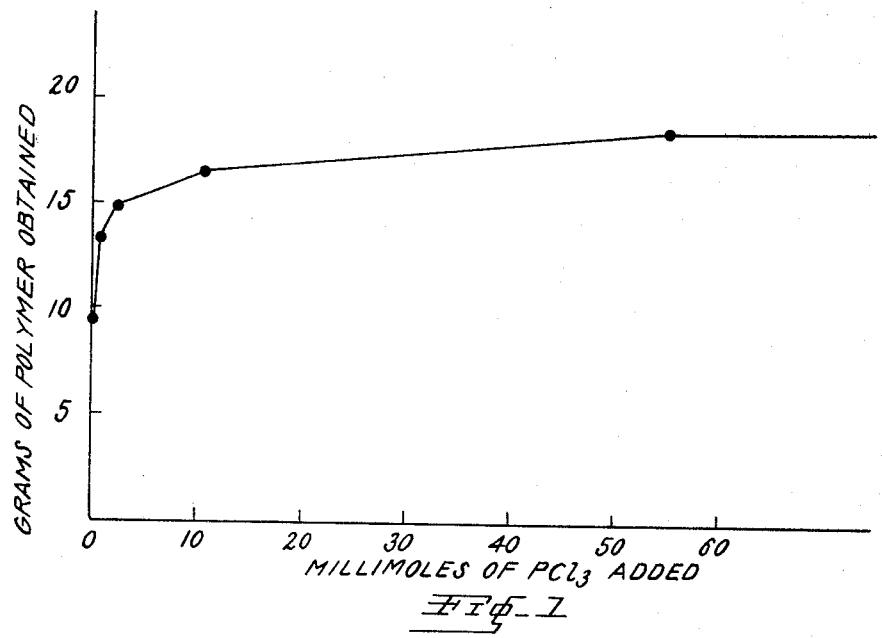
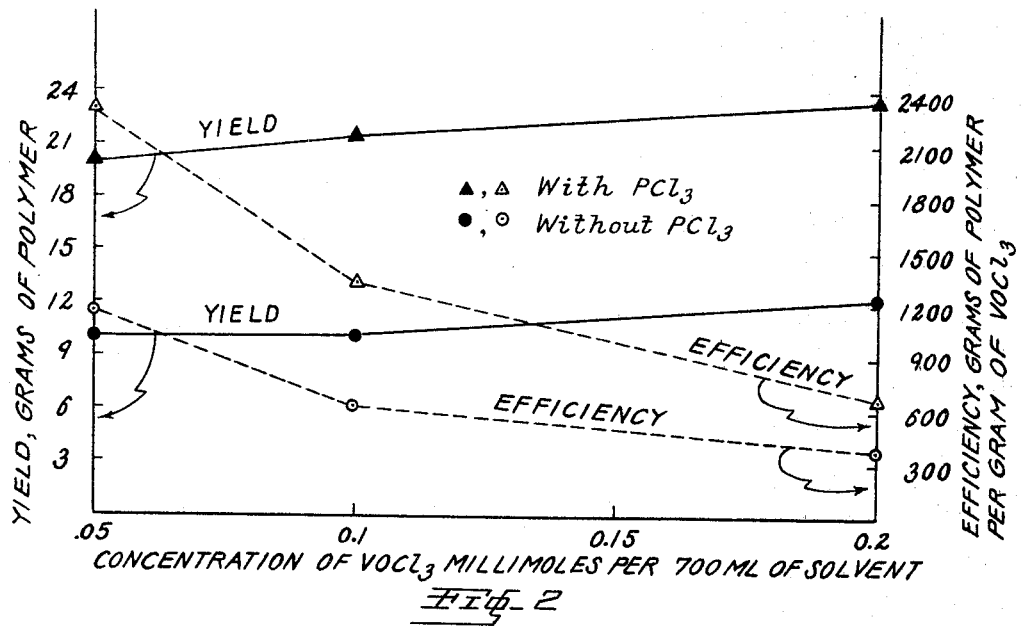

3,507,843
ACTIVATION OF VANADIUM-BASED CATALYST WITH PHOSPHORUS TRIHALIDES
Frederick C. Loveless, Oakland, N.J., assignor to Uniroyal, Inc., a corporation of New Jersey
Continuation of application Ser. No. 304,597, Aug. 26, 1963. This application Oct. 17, 1968, Ser. No. 772,460
Int. Cl. C08f 15/40, 1/56, 1/42
U.S. Cl. 260—80.78                                 7 Claims

ABSTRACT OF THE DISCLOSURE

A hydrocarbon-soluble catalyst for making olefin copolymer rubber (e.g. EPDM) based on a vanadium salt (e.g. $VOCl_3$) and an alkylaluminum compound (e.g. ethylaluminum sesquihalide) is activated by adding phosphorus trichloride.

---

This application is a continuation of my copending application Ser. No. 304,597, filed Aug. 26, 1963, now abandoned.

This invention relates to improved catalysts for the polymerization of olefins, and methods for the polymerization of olefins using these improved catalysts. More particularly the invention comprises catalysts obtained by the interaction of (1) a vanadium salt,
(2) an organometallic compound of the type represented by the formulae
 (a) RMgX (Grignard reagent), where R is a hydrocarbon radical having for example from 1 to 12 carbon atoms for example in alkyl radical such as methyl, ethyl, etc. or an aryl radical such as phenyl, naphthyl, etc., and X is a halogen atom,
 (b) $LiAlR_4$, where R is as previously defined,
 (c) $R_A AlX_B$, where R and X are as previously defined, A is a number from 1 to 3, B is a number from zero to 2, and $A+B=3$,
and (3) a phosphorus trihalide.

In the following, components (1) and (2)—i.e., the vanadium salt and the Grignard reagent or the organoaluminum compound—or their interaction product, will frequently be referred to as the primary catalyst system, and component (3), the phosphorus trihalide, will sometimes be referred to as the activator.

The invention will be described with reference to the accompanying drawing, wherein:

FIG. 1 is a graph of the yield of polymer plotted against the amount of phosphorus trichloride added; and, FIG. 2 is a graph of the yield and efficiency, plotted against the concentration of vanadium oxytrichloride.

The polymerization and interpolymerization of olefins, particularly alpha-olefins, using as a catalyst the combination of a transition element of groups IV through VIII with a metal hydride or a metal alkyl, is well known. The art is summarized by Gaylord and Mark, "Linear and Stereoregular Addition Polymers," Interscience, New York (1959), Chapter VII. Hydrocarbon-insoluble (i.e., heterogeneous) and hydrocarbon-soluble (i.e., homogeneous) variations of such catalysts are known and are described in that book.

Schreyer, U.S. Patent 2,962,451, Nov. 29, 1960, describes a polymerization catalyst suitable for use in the polymerization of ethylenically unsaturated hydrocarbon monomers, which comprises the product formed by admixing a vanadium compound of the class consisting of vanadium halides, oxyhalides and alkoxides, said vanadium being at a valence state of three or above, with a compound having at least one metal-to-carbon bond of the class consisting of alkylaluminum halides and metal alkyls wherein the metal is aluminum, tin, or lithium-aluminum, said compound being admixed in sufficient quantity to reduce the vanadium compound at least in part to a valency below three.

British Patent 886,368, U.S. Rubber Company, published Jan. 3, 1962, describes hydrocarbon-soluble catalysts comprising admixtures of one molar proportion of a vanadium compound selected from vanadium tetrachloride ($VCl_4$) and pervanadyl trichloride ($VOCl_3$) with more than five molar proportions of one or more organoaluminum compounds having the formula $AlR'_n X_{3-n}$ in which $n$ is an integer from 1 to 2 inclusive, R' is a radical from the group consisting of saturated alkyl, aryl, alkaryl, and aralkyl hydrocarbon radicals, and X is Cl or Br. These catalysts are used for the preparation of rubbery high polymers by the copolymerization of ethylene with another alpha-olefin.

Hagemeyer and Edwards, U.S. Patent 2,917,500 (assigned to Eastman Kodak) describes a catalyst for the polymerization of 1-olefins comprised of aluminum powder, an antimony or phosphorus halide, and a titanate $Ti(OR)_4$.

The present invention is directed to a novel improvement in polymerization catalysis, involving a catalyst prepared from the ingredients described under (1), (2) and (3), above. The invention is based upon the discovery that the addition of a phosphorus trihalide such as phosphorous trichloride, phosphorus tribromide or phosphorus triiodide, to catalyst systems based on (1) and (2) as described above causes a substantial increase in the amount of polymer produced per unit time when compared to an identical system *not* containing $PCl_3$.

The olefins which are polymerized by the present process include ethylene, propylene and similar alpha-olefins having the formula $CH_2=CHR$ in which R is hydrogen or a hydrocarbon radical, particularly a saturated alkyl hydrocarbon radical having from 1 to 8 carbon atoms (including, e.g., butene-1; hexene-1; 4-methylpentene-1; 5-methylhexene-1; 4-ethylhexene-1).

A preferred form of the invention is directed to the copolymerization of ethylene and propylene to yield rubbery products, and an especially preferred practice of the invention contemplates the production of unsaturated, sulfur-vulcanizable, rubbery terpolymers of ethylene and propylene and a diene such as dicyclopentadiene, methylcyclopentadiene dimer, 1,4-hexadiene, 11-ethyl-1,11-tridecadiene, 1,9-octadecadiene, 1,5-cyclooctadiene, or other suitable copolymerizable dienes such as are disclosed in British Patent 880,904 of Dunlop Rubber Co., Oct. 25, 1961, U.S. Patents 2,933,480, Gresham and Hunt, Apr. 19, 1960, and 3,000,866, Tarney, Sept. 19, 1961, and Belgian Patents 623,698 and 623,741 of Montecatini, Feb. 14, 1963, the disclosures of which are hereby incorporated herein by reference. Preferred terpolymers contain from about 1 to about 25% (more preferably about 2 to about 15%) by weight of dicyclopentadiene or the like; the remaining portion of the interpolymer frequently contains from about 30% to about 80% and preferably from about 40% to about 70% by weight of propylene, the remainder being ethylene.

Considering in more detail the primary catalyst system which is activated in accordance with the method of the invention, such primary catalyst system comprises, as indicated previously, (1) a vanadium salt and (2) a Grignard reagent or an organoaluminum compound. Among the vanadium salts which may be used there may be mentioned vanadium halides, oxyhalides, alkoxides and acetylacetonates. Specific examples of these salts are vanadium dichloride, vanadium trichloride or vanadium tetrachloride or tetrabromide, vanadium oxydichloride, vanadium oxytrichloride, alkyl vanadates (especially where the alkyl group contains 1–12 carbon atoms, e.g., n-butyl vanadate) vanadyl or vanadium acetylacetonate, and the like, as well as salts based on mixtures of more than one of the foregoing types, such as dialkyl halovanadates (e.g., dibutyl chlorovanadate) and alkyl dihalovanadates (e.g. butyl dichlorovanadate). In many cases preferred vanadium compounds are vanadium oxytrichloride, vanadyl or vanadium acetylacetonate, lower alkyl vanadates (alkyl groups of 1–4 carbon atoms) and halovanadates, especially chlorovanadates (mono- and dichloro). Such a vanadium compound (1), is combined with an organometallic compound (2) to give the primary catalyst system. Unfortunately such a conventional primary catalyst system, as indicated above, is frequently not as effective as would be desired, and may soon become inefficient or inactive. The present invention is based on my surprising discovery that the primary catalyst system is made more effective, maintains its activity for a longer period, or can be reactivated after it begins to slow down, if there is added to it a phosphorus trihalide. The benefits of the use of phosphorus trihalide in accordance with the invention are especially important in making ethylene-propylene or ethylene-propylenediene interpolymer, since such interpolymerization is in general much more difficult to effect efficiently than the simple homopolymerization of ethylene.

The preferred primary catalyst system for use in the present invention is the soluble (i.e., soluble in organic hydrocarbon solvents, including the monomers to be polymerized) catalyst formed by interaction of vanadium oxytrichloride and an alkylaluminum halide, in which category I include mixtures of alkylaluminum halides, such as may be formed by admixing dialkylaluminum monohalide with monoalkylaluminum dihalide, or even by mixing trialkylaluminum with aluminum trihalide. In such a preferred soluble primary catalyst system, the molar ratio of aluminum to vanadium is at least 5:1, and preferably at least 10:1; higher ratios such as 20:1, 35:1, 50:1, or even higher, may also be used. These preferred soluble primary catalyst systems are remarkable for their ability to form an amorphous rubbery ethylene-propylene interpolymer, and particularly for their ability to form an amorphous ethylene-propylene-diene interpolymer that is sulfur-vulcanizable to yield a high quality rubber stock. In preferred $R_A AlX_B$ compounds R is a lower alkyl (1 to 4 carbon atoms) and X is chlorine.

If desired even higher ratios of aluminum to vanadium (e.g. 200:1 or higher) may be employed, especially in those cases where the concentration of vanadium compound used is very small.

However, if desired, with certain catalyst combinations, relatively low ratios (e.g., 1:1) of aluminum to vanadium may be used in the invention.

It will be understood that the type formula $A_A AlX_B$ used to describe the typical organoaluminum compounds is simply an empirical formula intended to include any of a wide variety of compounds or mixtures of compounds that might result for example from bringing together trialkylaluminum compounds, aluminum trihalides and/or alkylaluminum halides. For example, equimolar mixtures of monoalkylaluminum dihalide and dialkylaluminum monohalide, or equimolar mixtures of trialkylaluminum trihalide, may be regarded as producing the alkylaluminum sesquihalide ($R_3Al_2X_3$, which may be written empirically as $R_{1-1/2}AlX_{1-1/2}$). A mixture of trialkylaluminum and dialkylaluminum monochloride may be regarded as providing a material of the type $R_5Al_2Cl$ or empirical formula $R_{2-1/2}AlCl_{1/2}$. It should be noted that the type formula $R_A AlX_B$ as defined permits the use of trialkylaluminum as such, but not aluminum trihalide as such.

Particularly useful organoaluminum compounds are the alkylaluminum compounds, in which category I include alkylaluminum halides.

Although the soluble catalyst compositions have been described as preferred, especially in the interpolymerization of ethylene and propylene, it will be understood that in other cases, notably the homopolymerization of propylene, the insoluble or heterogeneous type of catalyst is used.

The amount of phosphorus trihalide employed in accordance with the invention is in general not especially critical. Surprisingly small amounts of activator, e.g., about 0.1 to 0.5 mole of phosphorus trihalide per mole of vanadium compound, may be sufficient in many cases to produce a noticeable effect. Usually it is preferred to use somewhat larger amounts, typically about 5 to 20 moles of phosphorus trihalide per mole of vanadium, but it will be understood that considerably more activator than this may be employed if desired. Ordinarily there is little or no proportionate added advantage, as far as activating effect is concerned, in using appreciably more than about 20–30 moles of phosphorus trihalide per mole of vanadium and for reasons of economy I generally do not use more than this amount, although I desire to emphasize that there is no critical upper limit on the amount that can be employed. Thus, indefinitely larger amounts of phosphorus trihalide, e.g., 500–600 moles or even more, can be employed, although there is no added advantage in so doing, and ordinarily such large amounts would be avoided as unnecessary if not wasteful. The optimum amount of phosphorus trihalide in any given case will depend upon the specific composition of the primary catalyst, as well as such variables as the exact polymerization procedure. The phosphorus trihalide may all be introduced at the start, or it may be introduced continuously or in increments as the polymerization proceeds. The phosphorus trihalide in some cases may be combined with either of the primary catalyst ingredients before introduction into the monomers to be polymerized or after introduction of at least a portion of the monomers.

A preferred procedure involves first combining the primary catalyst ingredients in the presence of at least a portion of the monomer(s), and immediately adding the phosphorus trihalide.

The process is conveniently carried out in a solvent although an added solvent is not essential; the monomers being polymerized can serve as the solvent. In general, the normal solvents for Ziegler-type coordination polymerization can be used. These include the aromatic hydrocarbons, aliphatic hydrocarbons, chlorobenzene, tetrachloroethylene, and any other solvents which will not destroy the catalyst. Furthermore, the procedure may otherwise be the same as in conventional practice as far as such details as temperature of polymerization, pressure concentration of catalyst, and the like, are concerned.

One preferred practice of the invention contemplates continuously (1) interpolymerizing ethylene, propylene and a diene such as dicyclopentadiene—for example, by introducing the mixture of monomers into a first polymerization zone wherein it is combined with at least a portion of each of the catalyst ingredients and (2) withdrawing a stream containing at least a portion of terpolymer from said zone, and (3) repeating steps (1) and (2) in one or more subsequent polymerization zones, into which the reaction stream withdrawn from the previous polymerization zone is introduced successively. There may be introduced incrementally or continuously into each zone more catalyst ingredients, as required, to maintain the system at peak efficiency consistent with economical utilization of catalyst. More of one or more of the monomers may be introduced in such subsequent reaction zones, if desired. The stream issuing from the final reaction zone, in the form of a thick solution usually called a cement, may be processed in the usual way to separate the polymer and remove catalyst residues.

Schreyer, in U.S. Patent 2,962,451, teaches catalysts made by mixing a vanadium compound in which the vanadium is in a higher state of valence, that is, +3 or higher, with an organometallic compound in amount sufficient to reduce the vanadium at least in part to a valence state of less than +3. While such a catalyst may be activated in accordance with the present invention it is desired to point out that it is not essential for purposes of the invention that the vanadium compound employed have a valence of at least +3. On the contrary, vanadium compounds in which the vanadium has a valence of less than +3, such as vanadium dichloride, may be used. However, it will be understood that in that case the product obtained by mixing the vanadium compound with the organometallic compound is not an active catalyst until the activating substance of the invention is added. This is in contrast to the product obtained by mixing a vanadium +3 compound with the organometallic compound, which product is an active catalyst even before the activator is added. Although vanadium compounds in which the vanadium has a valence of less than +3 may be used in the invention, it is preferred to use vanadium compounds in which the vanadium has a valence of at least +3; such compounds are particularly advantageous from the standpoint of the described continuous polymerization procedure in which the catalyst is introduced into a first polymerization zone without activator, and the activator is added subsequently after a ceratin amount of polymerization has taken place.

The following modes of practicing the invention may be mentioned:

(A) Mix (1), (2) and (3) in any order freshly in the presence of the monomers.

(B) Mix (1) and (2) in the absence of the monomers, and later add the mixture to the monomers either before or after adding (3) to the monomers.

(C) Mix (1) and (3) in the absence of the monomers, then add the mixture to the monomers either before or after adding (2) to the monomers.

(D) Mix (2) and (3) in the absence of the monomers, then add the mixture (preferably without undue delay) to the monomers, either before or after adding (1) to the monomers.

(E) Mix (1), (2) and (3) in the absence of the monomers, and then add the mixture (preferably without undue delay) to the monomers.

Phosphorus trichloride used in accordance with the invention increases the catalyst efficiency over a wide range of catalyst concentrations. FIG. 2 illustrates the fact that, with the primary catalyst (1)+(2), catalyst efficiency increases with decreasing catalyst concentration, but that this increased efficiency can be greatly magnified by the addition of $PCl_3$ in accordance with the invention. The results in FIG. 2 are based on the copolymerization of ethylene and propylene in heptane, using ethyl aluminum sesquichloride and vanadium oxytrichloride in mole ratio of 10:1, with and without phosphorus trichloride.

In a typical prior polymerization method not employing $PCl_3$, a quantity of dry solvent is saturated with ethylene and propylene in the absence of oxygen, then ethylaluminum sequichloride and vanadium oxytrichloride are added. Polymerization ensues immediately upon addition of the latter compound. In the present invention, if a quantity of phosphorus trichloride is added to the monomer solution prior to catalyst addition, the resulting polymerization is more vigorous, and substantially more polymer is produced in the same length of time, than in a similar system containing no $PCl_3$.

However, the order of mixing of the three catalyst components may be varied, as indicated. For instance, $PCl_3$ may be added after polymerization has started, or it may be pre-mixed with the vanadium compound and the two added together to the monomer solution already containing the aluminum compound. It is generally inadvisable, however, to allow a mixture of aluminum alkyls and $PCl_3$ to stand for prolonged periods before reacting them with the vanadium compound. Mixing of the primary catalyst components in a short space of time (e.g., a few minutes) allows the $PCl_3$ to be added at any point in the sequence.

In using $Et_3Al_2Cl_3$ and $VOCl_3$ according to British Patent 886,368, the usual Al/V atomic ratio is 10 or 20 to 1, and the present invention, for the most part, usually utilizes these ratios. In actuality, with certain catalyst combinations, the Al/V ratio may be as low as 1/1. For practical purposes, the preferred upper limit to the Al/V ratio is 20/1, but a higher ratio is permissible, as indicated, and does not impair the polymerization process.

The effect of varying concentrations of $PCl_3$ on the polymerization is illustrated in FIG. 1, which shows data obtained in the copolymerization of ethylene and propylene in heptane, using 1.0 millimole of ethylaluminum sesquichloride and 0.1 millimole of vanadium oxytrichloride. The $PCl_3/V$ ratio may be, for example, in the range from 1/2 up to 550/1. A very pronounced rise in the yield is obtained through the presence of the $PCl_3$, as can be seen from the graph. It is apparent that 80% of the maximum increase in yield is attained at the ratio of 10/1, while at higher ratios there is very little further increase in yield, there being none perceptible at ratios above 55/1.

While the normal practice of this invention is to increase the efficiency of catalyst prepared in the presence of monomer, it is also true that $PCl_3$ increases the efficiency of catalyst prepared in the absence of monomer (pre-mixed catalyst). If the aforementioned $Et_3Al_2Cl_3$ and $VOCl_3$ are mixed outside the reaction vessel and aged a brief time, then added to a solution of monomers, the rate of polymerization is very low and the yield of polymer is very small. If, however, $PCl_3$ is added to the monomer solution before or after the pre-mixed catalyst is added, a substantial increase in polymer yield is obtained.

The following examples will serve to illustrate the practice of the invention in more detail.

EXAMPLE I

A dry, 2-liter, 3-necked flask was equipped with stirrer, thermometer, gas inlet tube, and a vertical condenser mounted with a gas outlet tube. The flask was kept filled with dry argon prior to polymerization. Into this flask was introduced 700 ml. of pure n-heptane. The solvent was then saturated with ethylene and propylene, by a continuous flow of 2 liters of each gas per minute, for ten minutes. The gas flow is then maintained at that level for the duration of the polymerization (which is conducted at ambient temperature). One ml. of $PCl_3$, 1.0 millimole of $Et_3Al_2Cl_3$, and 0.1 millimole of $VOCl_3$ were added in that order. An immediate exotherm occurred upon addition of the $VOCl_3$. The polymerization was allowed to proceed for 30 minutes and was then quenched by addition of 15 ml. of isopropanol. Twenty ml. of a 5% toluene solution of an antioxidant, 2,2'-methylenebis-(4-methyl-6-tert-butyl-phenol), were next added to the polymer cement. The cement was clear and contained no insoluble polymer. The polymer was flocculated by pouring the cement, with stirring, into a 50/50 (by volume) methanol-acetone mixture. The precipitated polymer was isolated and dried, the yield being 18.6 grams. The intrinsic viscosity was 1.94 (in all instances herein, the intrinsic voscosity is measured at 135° C. in tetralin), and the wt.-percent of propylene was 46.

In an experiment identical to this, except that no $PCl_3$ was utilized, the following results were obtained: Yield, 9.4 g.; intrinsic viscosity, 3.88; wt.-percent of propylene, 46.

The above example illustrates the surprising increase in yield and decrease in molecular weight attained when $PCl_3$ is added to $Et_3Al_2Cl_3$-$VOCl_3$ catalyst.

EXAMPLE II

This experiment was run to determine whether high levels (viz., 5 ml.) of $PCl_3$ would have a damaging effect or an enhancement of the effect observed in Example I. This example is identical to Example I except that .5 ml. (55 millimoles) of $PCl_3$ was added to the solvent before the catalyst addition. The yield (17.6 g.) and properties were essentially the same as in Example I: intrinsic viscosity, 2.16; wt.-percent of propylene, 53.

EXAMPLE III

This example was identical to Example I, except that only 0.05 millimole of $PCl_3$ was added. The yield was 13.5 g., still considerably more than from a blank run containing no $PCl_3$. In this experiment the $PCl_3$ was equivalent to only half of the vanadium and $\frac{1}{20}$ of the $Et_3Al_2Cl_3$. Analyses showed intrinsic viscosity, 3.05: wt.-percent propylene, 46. This illustrates the effectiveness of $PCl_3$ at very low concentration. See FIG. 1 for summary of polymer yield vs. $PCl_3$ level.

EXAMPLE IV

This example was identical to Example I in all respects except that the solvent for the polymerization was benzene instead of heptane. The yield was 21.7 g.; the intrinsic viscosity was 1.65; and the wt.-percent of propylene was 54.

It can be seen by this that the activation by $PCl_3$ is just as efficient in benzene as in heptane, in which the yield in a comparable run (Example I) was 18.6 g. (A run identical to this but containing no $PCl_3$ produced only 10.83 grams.) See FIG. 2.

EXAMPLE V

This example illustrates the preparation of a terpolymer of ethylene, propylene and dicyclopentadiene in the presence of $PCl_3$.

In this run, 700 ml. of n-heptane were saturated with ethylene and propylene (at 2 liters of each, per minute) for ten minutes and then 1.0 ml. of $PCl_3$ was added. A dropping funnel was fitted to the flask containing a solution of 2.0 ml. of dicyclopentadiene in 30 ml. of heptane. Then 0.5 mmole of $Et_3Al_2Cl_3$ and 0.05 mmole of $VOCl_3$ were added. Immediately 3 ml of the diene solution were added, and then the drip rate was slowed so that the rest of the solution was added over a 20-minute period. Second catalyst shots of 0.5 mmole of $Et_3Al_2Cl_3$ and 0.5 mmole of $VOCl_3$ were added after 10 minutes. After 30 minutes, the reaction was quenched and worked up as in Example I.

The yield was 15.0 g. of terpolymer: intrinsic viscosity, 2.61; wt.-percent of propylene, 37; iodine number, 17. This illustrates that the $PCl_3$ in no way interferes with formation of a rubbery terpolymer. This yield is significantly higher than is obtained in the absence of $PCl_3$.

EXAMPLE VI

This example illustrates the use of $PCl_3$ in preparation of another terpolymer, ethylene/propylene/1,4-hexadiene. The procedure was as follows: 700 ml. of heptane was saturated, at 2 liters per minute of each, with ethylene and propylene. Then 1.0 ml. of $PCl_3$ was added to the monomer solution, then 1.0 mmole of $Et_3Al_2Cl_3$ and 0.1 mmole of $VOCl_3$. Immediately, dropwise addition was started, of a solution of 3.5 ml. of 1,4-hexadiene in 30 ml. of heptane, and continued for 25 minutes. Fifteen minutes after catalyst addition, second identical additions of each catalyst were made. After 30 minutes, the run was quenched and worked up in the usual way. The yield of terpolymer was higher than in a similar run differing only in the $PCl_3$ was omitted as shown below:

|  | With $PCl_3$ | Without $PCl_3$ |
| --- | --- | --- |
| Yield | 16.0 | 12.9 |
| Iodine number | 4.4 | 3.4 |
| Intrinsic viscosity | 1.66 | 2.45 |
| Wt.-ratio E/P | 54/46 | 59/41 |

EXAMPLE VII

This example illustrates that $PCl_3$ added after polymerization has started will still give enhancement of yield.

(A) A blank run, without activator, is described here. The apparatus is as described in Example I, the solvent (700 ml. of benzene) was saturated (at 2 liters per minute of each) with ethylene and propylene (this flow was continued throughout the run). Then, 1.0 mmole of $Et_3Al_2Cl_3$ and 0.1 mmole of $VOCl_3$ were added to the reaction flask, in that order. Immediate exotherm occurs on addition of $VOCl_3$. The polymerization was allowed to proceed for 30 minutes and then quenched with alcohol; antioxidant was added and the polymer was isolated by flocculating in methanol. The yield was 10.8 g.; intrinsic viscosity, 167; wt. percent of propylene, 55.

(B) This run was identical to VII-A except that 1.0 mmole of $PCl_3$ was added ten minutes after polymerization had started. The cooling rate of the reaction mixture slowed considerably, showing an increase in polymerization rate. The reaction was quenched with alcohol 30 minutes after initial catalyst addition, and worked up as usual. The yield was 17.4 g., demonstrating that the addition of $PCl_3$ markedly increases the yield over that in the blank run. The intrinsic viscosity was 1.82 and the wt. percent propylene 49.

EXAMPLE VIII

The run was identical to Example I, except only that 0.5 ml. of $PCl_3$ (not 1.0 ml. as in Example I) was added before catalyst addition. The yield was 18.5 g. of copolymer.

EXAMPLE IX

This run shows the beneficial effect of $PCl_3$ on $R_3Al$-$VOCl_3$ combinations which normally give a heterogeneous catalyst in heptane and whose efficiency is very low (less than 100 g. of polymer per gram of $VOCl_3$).

The monomer solution was prepared as in Example I. Then 1.0 ml. of $PCl_3$, 1.0 mmole of triisobutylaluminum, and 0.1 mmole of $VOCl_3$ were added, in that order. The usual purple precipitate of catalyst was not in evidence, and the polymerization was more vigorous than with a normal heterogeneous catalyst. The yield (after 30 min.) was 9.5 g. This is an efficiency of 550 g. of polymer per gram of $VOCl_3$, considerably higher than that expected without $PCl_3$.

EXAMPLE X

This run shows the large increase in efficiency attainable when very low concentrations of vanadium are used in conjunction with $PCl_3$.

The run is similar to Example VII-A, except that 0.5 mmole of $PCl_3$ was added to the solvent prior to catalyst addition, and only .01 mmole of $VOCl_3$ (one-tenth of that in VII-A) was used. The yield was 11.1 grams, the intrinsic viscosity was 2.52 and the wt. percent of propylene was 44. It should be noted here that a better yield was obtained than in the blank run in which *ten times as much* $VOCl_3$ was used (Example VII-A).

In an identical run in which the $VOCl_3$ level was 0.01 mmole, but *no* $PCl_3$ was employed, the yield was 2.9 grams of polymer, again illustrating the enhancement of catalyst efficiency by $PCl_3$.

The efficiency of catalyst in the following examples illustrates the effect of $PCl_3$ in the above-mentioned experiments.

| Quantities (mmole) | | | Yield, grams | Efficiency g. Polymer/ g. $VOCl_3$ |
| --- | --- | --- | --- | --- |
| $Et_3Al_2Cl_3$ | $VOCl_3$ | $PCl_3$ | | |
| 1.0 | .01 (X) | 0.5 | 11.1 | 6,400 |
| 1.0 | .01 | 0 | 2.9 | 1,680 |
| 1.0 | 0.10 (VII-A) | 0 | 10.83 | 625 |

EXAMPLE XI

In this example, the procedure is identical to that in Example I up to and including saturation of the solvent with monomers. In a separate flask, 2.0 mmoles Et₃Al₂Cl₃ and 0.2 mmole VOCl₃ were mixed in heptane solvent and aged 20 minutes. Then one-half of this soluble catalyst mixture was added to the monomer solution. No exotherm occurred. After one minute 1.0 mmole of PCl₃ was added and an immediate exotherm occurred. The polymerization was run for 30 minutes, and worked up in the usual way. The yield of polymer was 14.7 grams; intrinsic viscosity, 3.6; wt. percent, propylene, 42. Without addition of PCl₃ such a catalyst produces only 0–4 grams of polymer.

What I claim is:

1. A method of copolymerizing ethylene, propylene and a copolymerizable diene to form an amorphous, sulfur-vulcanizable rubber comprising mixing said monomers with a primary catalyst comprising
    (1) vanadium oxytrichloride and
    (2) an alkylaluminum compound of the formula $R_A AlX_B$, where R is lower alkyl, A is a number from 1 to 3, B is a number from zero to 2, $A+B=3$, and X is a halogen atom, and thereafter introducing into the monomer-catalyst mixture
    (3) from 0.1 to 30 moles, per mole of (1), of phosphorus trichloride,
the ratio of (2) to (1) being from 5:1 to 200:1, the said copolymerization being conducted in a medium consisting of a hydrocarbon solvent, and the said catalyst being soluble in said solvent.

2. A method of making a sulfur-vulcanizable, unsaturated, amorphous interpolymer of ethylene, propylene, and dicyclopentadiene comprising contacting the said monomers with a soluble catalyst composition comprising vanadium oxytrichloride, an alkylaluminum chloride in which the alkyl group has from 1 to 4 carbon atoms, and a phosphorus trihalide, the mole ratio of aluminum to vanadium being from 5:1 to 200:1 and the amount of phosphorus trihalide being from 0.1 to 30 moles per mole of vanadium, the interpolymerization being conducted in a medium consisting of a hydrocarbon solvent, the said catalyst being soluble in said solvent.

3. A method as in claim 2 in which the phosphorus trihalide is phosphorus trichloride.

4. A method for copolymerizing ethylene and an alpha-olefin containing at least three carbon atoms, to form an amorphous, rubbery copolymer, comprising contacting said monomers with a catalyst made by mixing
    (I) a primary catalyst comprising
        (1) vanadium oxytrichloride and
        (2) a lower alkylaluminum halide
and thereafter introducing to the monomer-catalyst mixture in measured amount over a period of time during the polymerization reaction.
    (II) a phosphorus trihalide,
the mole ratio of (2):(1) being from 5:1 to 200:1, and the amount of (II) being at least 0.1 mole per mole of (1), the copolymerization being conducted in a medium consisting of a hydrocarbon solvent, the said catalyst being soluble in said solvent.

5. A method of making an amorphous copolymer of ethylene and propylene comprising contacting the said monomers, in solution in a solvent medium, with a catalyst composition dissolved in said medium and made by bringing together in said medium, in the presence of the monomers, vanadium oxytrichloride, an alkylaluminum sesquichloride in which the alkyl group has from 1 to 4 carbon atoms, and phosphorus trichloride, the mole ratio of aluminum to vanadium being from 5:1 to 200:1 and the amount of phosphorus trichloride being from 0.1 to 30 moles per mole of vanadium, the said solvent medium consisting of an aromatic or aliphatic hydrocarbon solvent.

6. A method as in claim 5 in which the solvent consists of n-heptane and a copolymerizable diene is present, whereby an unsaturated, sulfur-vulcanizable terpolymer is formed.

7. A method as in claim 6 wherein the said diene is dicyclopentadiene.

References Cited

UNITED STATES PATENTS

| | | | |
|---|---|---|---|
| 3,203,940 | 8/1965 | Long | 260—88.2 |
| 3,340,241 | 9/1967 | Natta et al. | 260—88.2 |
| 3,377,326 | 4/1968 | Loveless | 260—80.78 |

JAMES A. SEIDLECK, Primary Examiner

U.S. Cl. X.R.

260—88.2